United States Patent
Tsai

(10) Patent No.: US 11,062,823 B2
(45) Date of Patent: Jul. 13, 2021

(54) INSULATED WIRE CAPABLE OF CHANGING COLOR WHEN OVERHEATED UNDER CURRENT LOAD AND METHOD FOR MAKING THE SAME

(71) Applicant: Cheng-Lang Tsai, New Taipei (TW)

(72) Inventor: Cheng-Lang Tsai, New Taipei (TW)

( * ) Notice: Subject to any disclaimer, the term of this patent is extended or adjusted under 35 U.S.C. 154(b) by 0 days.

(21) Appl. No.: 16/849,896

(22) Filed: Apr. 15, 2020

(65) Prior Publication Data
US 2020/0381142 A1 Dec. 3, 2020

(30) Foreign Application Priority Data

May 28, 2019 (TW) .................................. 108118429

(51) Int. Cl.
*H01B 7/32* (2006.01)
*H01B 7/36* (2006.01)
*G01K 11/12* (2021.01)

(52) U.S. Cl.
CPC .............. *H01B 7/324* (2013.01); *G01K 11/12* (2013.01); *H01B 7/361* (2013.01)

(58) Field of Classification Search
CPC .......... H01B 7/324; H01B 7/32; H01B 7/361; G01K 11/12
See application file for complete search history.

(56) References Cited

U.S. PATENT DOCUMENTS

| | | | |
|---|---|---|---|
| 5,008,136 A | 4/1991 | Chamberlain | |
| 5,165,797 A | 11/1992 | Kuroda et al. | |
| 5,922,996 A * | 7/1999 | Ryeczek | G01K 11/12 174/112 |
| 2008/0121171 A1* | 5/2008 | Hulsey | G02B 6/443 116/216 |
| 2010/0227167 A1* | 9/2010 | Tsai | D02G 3/36 428/375 |
| 2017/0243675 A1* | 8/2017 | Prange | B41M 5/24 |
| 2018/0203323 A1* | 7/2018 | Goss | G01K 7/16 |

FOREIGN PATENT DOCUMENTS

CN 105869757 A 8/2016

* cited by examiner

*Primary Examiner* — Timothy J Thompson
*Assistant Examiner* — Amol H Patel
(74) *Attorney, Agent, or Firm* — CIPO IP Group

(57) ABSTRACT

An insulated wire capable of changing color when overheated under a current load includes an insulated core, at least one thermochromic strip, and a transparent plastic protective layer. The thermochromic strip is wound and fixed on the peripheral surface of the insulated core. The transparent plastic protective layer clads the peripheral surface of the insulated core and/or the top surface of the thermochromic strip. When the insulated core is overloaded and generates heat, the heat is transmitted to, and thereby changes the color of, the thermochromic strip. The color change is visible through the transparent plastic protective layer and can therefore alert the wire user in real time that the load on the insulated wire should be lowered.

28 Claims, 6 Drawing Sheets

INSULATED WIRE CAPABLE OF CHANGING COLOR WHEN OVERHEATED UNDER CURRENT LOAD AND METHOD FOR MAKING THE SAME

CROSS-REFERENCE TO RELATED PATENT APPLICATION

This non-provisional application claims priority to and the benefit of, under 35 U.S.C. § 119(a), Taiwan Patent Application No. 108118429, filed in Taiwan on May 28, 2019. The entire content of the above identified application is incorporated herein by reference.

FIELD

The present disclosure relates to a wire structure, and more particularly to an insulated wire that changes color when overheated under a current load. The insulated wire includes therein a thermochromic coating layer and a transparent plastic film covering and protecting the thermochromic coating layer from damage by the negative impact of ultraviolet (UV) light and moisture, which maintains the thermochromic properties of the thermochromic coating layer. Therefore, the safety-related coding regulations for insulated wire colors in different countries can be easily followed by simply changing the material color(s) of the thermochromic coating layer and of a plastic insulating layer of the insulated wire, so as to produce insulated wires whose outer color complies with such regulations and enable the international marketing thereof. Further, when the conductive core of the insulated wire is overloaded and heat has been generated by the overloading, the heat can be conducted directly and rapidly to the thermochromic coating layer through the plastic insulating layer. Therefore, as soon as the temperature of the conductive core reaches the thermochromic transition temperature (e.g., 70° C.) of the thermochromic coating layer, the color of the thermochromic coating layer will change and can be seen through the transparent plastic film and a transparent plastic protective layer, and therefore, from the outside of the insulated wire. This serves as a highly intuitive and readily identifiable early warning about the overloaded state of the insulated wire, thereby alerting the wire user in real time that the load on the insulated wire should be lowered to keep the insulated wire from damage by sustained overload. Accidents associated with such damage are thus to be prevented, and the safety of the user's life and property is to be ensured.

BACKGROUND

Most of the living creatures in the natural world have a precise temperature-sensing mechanism in their bodies so as to sense the variation of ambient temperature with precision and respond or react accordingly, thereby adapting to environmental changes and ensuring continued survival of their respective species. However, the mechanism and ability of sensing ambient temperature variation and responding or reacting accordingly is not exclusive to living creatures. Many substances in nature, whether organic or otherwise, can respond or react to a rise or fall in ambient temperature by changing their size, shape, or state (e.g., color). For centuries, people have become acquainted, through observation, with the aforesaid property of a large number of natural substances, and therefore viewed those substances as thermometers. Great efforts have been made in studying and analyzing the substances, with the objective of using such a substance to precisely detect changes in ambient temperature, particularly, using the color change of such a substance to identify temperature variation in the environment in an intuitive and rapid, if not real-time, manner. The special material property described above is referred to as being "thermochromic". The word "thermochromic" is in fact a combination of two Greek roots: "thermos", meaning heat, and "chroma", meaning color. Nowadays, thermochromic substances have been widely used in a variety of everyday products such as mood rings, forehead strip thermometers, battery testers, and coffee cups, to enable those products to precisely detect temperature or temperature-related states.

"Thermochromism" refers to a property by which a substance changes color when experiencing a change in temperature. The commercially available mood rings are a typical ornament that takes advantage of this property. A mood ring can change color in response to its wearer's body temperature so that others can guess the wearer's mood based on the color of the ring. While for some people it is debatable regarding their practical use, their existence readily reflects the fact that thermochromic substances have long been in extensive use in our daily lives. Moreover, the very substances have served practical purposes in many areas. For instance, a thermochromic substance can be added into the material of a baby bottle, a water bottle, or a cup so that the resulting bottle or cup can show a first, or safety-indicating, color (e.g., blue) when the liquid held in the bottle or cup is in a drinkable, low-temperature state (e.g., at 15~50° C.), thereby informing the bottle or cup user that the liquid can be safely consumed. If, conversely, the liquid is in an undrinkable, high-temperature state (e.g., at a temperature higher than 50° C.), the bottle or cup will show a second color (e.g., red) indicating lack of safety, thereby alerting the user that the liquid should not be drunk or should be drunk with care. Other examples of the application of thermochromic substances include some specially made towels, fabrics, and receipts that can be easily found in our daily lives and work. As a matter of fact, thermochromism is only one of a plethora of color changing phenomena. Substances that exhibit thermochromism can be generally divided into two types, by material attribute and the reversibility of color change, as follows.

(1) Inorganic thermochromic substances whose color change is reversible. The names, physical properties, and color-changing mechanisms of some examples of such substances are listed in Table 1 as follows.

TABLE 1

| | Inorganic Substances with Reversible Thermochromism | | |
|---|---|---|---|
| Substance | Thermochromic Transition Temperature (° C.) | Color Change | Color-Changing Mechanism |
| $Ag_2HgI_4$ | 50.7 | Yellow → Orange | Ag(I)-Hg(II) charge-transfer complex |

TABLE 1-continued

Inorganic Substances with Reversible Thermochromism

| Substance | Thermochromic Transition Temperature (° C.) | Color Change | Color-Changing Mechanism |
| --- | --- | --- | --- |
| $Cu_2HgI_4$ | 66.6 | Red → Dark Purple | Cu(I)-Hg(II) charge-transfer complex |
| $Tl_2HgI_4$ | 116.5 | Orange → Red | Change in crystal structure |
| ZnO | 42.5 | White → Yellow | Crystallographic defects due to loss of oxygen atoms under heat |
| $N_2O_4$ | | Colorless → Reddish Brown | $N_2O_4 \leftrightarrow 2NO_2$ |
| $Na_2O_2$ | 54.4 | White changes gradually to dark yellow | |
| $[(CH_3)_2CHNH_2]CuCl_3$ | 52 | Brown → Orange | Change in geometric configuration of $CuCl_3^-$ |
| $MoO_3$ | | Colorless → Yellow | |

(2) Organic thermochromic substances whose color change is reversible, and the names, physical properties, and color-changing mechanisms of some examples of such substances are listed in Table 2 as follows.

TABLE 2

Organic Substances that Exhibit Reversible Thermochromism

| Substance | Thermochromic Transition Temperature (° C.) | Color Change | Color-Changing Mechanism |
| --- | --- | --- | --- |
| p-aminophenyl dithizone mercury complex | | Orange → Blue | Proton transfer |
| o-tolidine (mono) vanillin | 100 | Pale Yellow → Yellow Ochre | Proton transfer |
| o-tolidine (di) vanillin | 120 | Golden → Green | Proton transfer |
| 2,3-bis(phenylethenyl)-5,6-dicyanopyrazine | 174.5 | Yellow → Red | Temperature rise enhances intermolecular π-π interactions and thereby causes lattice contraction |

Substances exhibiting irreversible thermochromism are those whose color change results from irreversible heat-induced reactions of decomposition, oxidation, or reduction on their ingredients. Substances capable of such irreversible reactions typically include elements in a relatively low oxidation state or ingredients that are readily decomposable when heated (e.g., carbonates, hydroxides, nitrates, oxalates, and halates). Hydrates and ammonates (e.g., $CoCl_2.6H_2O$, $NiSO_4.6H_2O$ and so on) may also decompose when heated. Ammonium salts are unstable under heat and are heat-decomposable as well. In particular, thermal decomposition of ammonium dichromate gives rise to a significant color change and can be expressed by the following chemical equation:

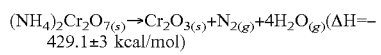
429.1±3 kcal/mol)

Once the reaction is completed, the color of the reactant will have been changed from orange to dark green.

In light of the foregoing properties of thermochromic substances, different industries may choose different thermochromic substances according to practical needs and use those substances in a variety of fields such as in military applications (e.g., camouflage material), construction (e.g., color-changing glass), medical applications (e.g., temperature-indicating material), financial applications (e.g., anti-counterfeiting material), and arts (e.g., works of art). Referring to FIG. 1a and FIG. 1b, the market has been supplied, for example, with a mug 10 that is coated with a thermochromic coating. When the liquid 100 (e.g., boiled water, tea, or coffee) in the mug 10 is at an appropriate drinking temperature, the mug 10 may show a safety-indicating color 111 (e.g., blue), a safety-indicating word 121 (e.g., COLD), or a safety-indicating pattern 131 (e.g., a smiling face) to inform the mug user that the liquid 100 can be safely drunk. Conversely, with continued reference to FIG. 1a and FIG. 1b, when the liquid 100 in the mug 10 is too hot to be drunk, the mug 10 may show a contrasting color 110 (e.g., pink), word 120 (e.g., HOT), or pattern 130 (e.g., a sad face), thereby warning the user that the liquid 100 should not be drunk or should be drunk with caution.

"Photochromism" is a material property quite similar to thermochromism and refers to a phenomenon in which some chemical substances in a material are convertible between two different forms in a reversible manner as a result of the material absorbing electromagnetic radiation. As the two forms correspond to different absorption spectra respectively, the chemical substances undergo a reversible color change when the light to which the substances are exposed varies. Of the numerous commercial applications of photochromic materials, the best-known examples nowadays must be dark glasses, sunglasses, and color-changing lenses. However, whether a substance be "photochromic" or "thermochromic", the greatest limitation in use is that the photochromic or thermochromic property will become unstable after thousands of hours of outdoor exposure (i.e., exposure to UV light). This is why photochromic or thermochromic substances and the associated technologies are not suitable for products that are bound to receive prolonged UV exposure.

Over the last three decades or so, considerable research efforts based on the aforesaid properties of thermochromic materials have been made worldwide in order to use such materials in the production of various products, the objective being, for example, for the thermochromic coating on a product to change color (e.g., from white indicating a low temperature to red indicating a high temperature, or from red indicating a low temperature to blackish purple indicating a high temperature) in response to variation in the stress/current/temperature load on the product and thereby provide a highly intuitive and readily identifiable early warning about the overloaded state of the product, alerting the user in real time that the stress/current/temperature load on the product should be lowered in order to keep the product from damage by sustained overload, prevent accidents associated with such damage, and thus ensure the safety of the user's life and property. In 1989, for instance, John R. Chamberlain, a British researcher, filed a patent application entitled "TEMPERATURE INDICATING PAINT AND METHOD OF OPERATING A SPECIMEN" (hereinafter, "Temperature-Indicating Paint") with the United States Patent and Trademark Office (hereinafter, "USPTO"). The application has been granted in 1991 with the U.S. Pat. No. 5,008,136 after examination (hereinafter, "First Prior Art Document"). As Chamberlain pointed out in his patent specification, the conventional thermal coatings, which change color or some other physical property at one or more known temperatures, have been a useful tool in the development of aero-engine components, and techniques employing such thermal coatings have several advantages over other methods in that they are non-destructive and relatively low-cost, and produce a temperature profile over the whole surface of a component rather than just at discrete points as with thermocouples. In fact, Chamberlain's Temperature-Indicating Paint as well as the conventional thermal coatings was a known thermochromic coating material back then, and all known thermochromic coating materials suffered from technical inadequacies as follows.

(1) Their changes in color/physical property are time-dependent to a varying degree and are pressure-dependent to a lesser extent. One common technique to solve this problem is to temperature-calibrate all multi-change paints at various times in a laboratory. Temperature, however, is not the only parameter affecting those changes, as other environmental conditions may also play a part. This makes it extremely difficult, if not impossible, to perform the foregoing temperature calibration at various times in a laboratory.

(2) To overcome the time dependency of known thermochromic coating materials, a datum coating can be applied to a component in order to provide the component with an isotherm that has been demonstrated to be time- and environment-independent under operating conditions. The mechanism involved in the change required to form the isotherm should be a function of temperature and irrespective of the operating environment, so that a datum isotherm can be allocated to the component with confidence regardless of the operating environment. Ideally, at least three datum markers covering a suitable temperature range should be used for internal calibration of a multi-change thermal paint. The datum coating approach is comparatively feasible, but its onerous procedure leads to a prohibitively high cost relative to the market value of the end product.

In light of the above, Chamberlain further mentioned in his patent specification that metal coatings of silver, gold, or a gold/silver alloy had been used as internal datum markers, wherein gold and silver were typically applied by electroplating, and gold/silver alloys by flame spraying. However, as Chamberlain pointed out, such coatings have been found unsatisfactory with particular reference to aero-engine development with components such as turbine blades, and this has much to do with the coating thickness. More specifically, the application methods employed usually result in an average coating thickness of 25 µm to 30 µm (for electroplating) or 50 µm to 75 µm (for flame spraying), and a coating material of this amount has been known to cause problems when flowing in the molten state by blocking turbine blade cooling holes. Moreover, the coating processes are relatively costly and time-consuming and require expensive equipment. In addition, as it is difficult to adequately mask off the leading- and trailing-edge cooling holes prior to plating the turbine blades with gold and silver, silver and gold plating tends to be missing from crucial areas of the turbine blades due to masking difficulties. As a result, there may be gaps in the data required to assess the blade temperature profile. Furthermore, the surface of a flame-sprayed coating can be so rough that contamination of the coating surface is highly probable, and that accurate interpretation/determination of the temperature state of the coating surface is unachievable. To solve the foregoing problems, Chamberlain conducted an extensive research and managed to develop, through repeated experiments and tests, the Temperature-Indicating Paint claimed in the First Prior Art Document. The Temperature-Indicating Paint includes a mixture of silver, inorganic glass frit, and an organic resin, dispersed in 10% to 70%, by weight, of a solvent. More specifically, the mixture contains one or more of the following elements: gold, platinum, palladium, copper, nickel, chromium, titanium, and silicon. The solvent may be 2-ethoxyethyl acetate or xylene; the mixture further includes a resin and a binary alloy of silver and one of the following elements: gold, copper, silicon, titanium, chromium, and nickel. The Temperature-Indicating Paint includes 40%~60% metal particle pigment, 5%-15% inorganic glass frit high-temperature binder, and the remainder organic resin binder. In the First Prior Art Document, Chamberlain also stated that a method of preparing a specimen with the Temperature-Indicating Paint includes coating the specimen surface with the Temperature-Indicating Paint by brushing or spraying, and then stoving the specimen for up to 5 minutes at a temperature between 750° C. and 850° C. in order to burn off the organic binder. Thus, the specimen will be able to show a temperature profile over the entire surface precisely in response to the change in ambient temperature while having the minimum required coating thickness.

Later in 1991, Masanori Kuroda and Michio Araki, Japanese researchers, filed a patent application entitled "THERMOCHROMIC COMPOSITE OXIDE AND METHOD FOR DETECTING TEMPERATURE THEREWITH" (hereinafter, "Thermochromic Composite Oxide") with the USPTO, which granted the application in 1992 with U.S. Pat. No. 5,165,797 (hereinafter, "Second Prior Art Document") after examination. As Kuroda and Araki pointed out in their patent specification, the Thermochromic Composite Oxide was developed for use in an extremely low-temperature environment as a thermochromic pigment with which to visually and intuitively detect the state of an object in such an environment. For example, the Thermochromic Composite Oxide can be used in the form of a temperature-sensitive label or paint to detect the temperature of a cryopreservation vessel chilled with liquid nitrogen for the storage of oval cells used in the techniques of artificial insemination, or to indicate the temperature of and detect leakage from pipelines and reservoir vessels for the transfer and storage of a liquid at an extremely low temperature (e.g., liquid hydrogen or oxygen as a liquid propellant of rockets). Kuroda and Araki also mentioned in the patent specification that, until the filing date of the Second Prior Art Document, the conventional thermochromic substances had shared the same problem that their thermochromic transition temperatures are mostly in the room temperature range or an elevated temperature range, and that their thermochromic properties become unstable, or the substances themselves may decompose, in a high-temperature state. To expand the use of thermochromic coating materials to extremely low-temperature applications, therefore, Kuroda and Araki thought it imperative to develop a thermochromic substance whose thermochromic transition temperature is extremely low. The two Japanese researchers performed an extensive study, conducted repeated experiments and tests, and finally succeeded in developing the Thermochromic Composite Oxide claimed in the Second Prior Art Document. The Thermochromic Composite Oxide has a cryologically low thermochromic transition temperature and remains stable (i.e., will not decompose) even when heated to a temperature as high as 1000° C. The Thermochromic Composite Oxide is a composite oxide of strontium (Sr) and manganese (Mn), with the Sr:Mn molar ratio being 3:1 to 1:3, is in powder form, and is a product obtained by calcining a blend of powder of strontium carbonate and manganese dioxide in a specific molar proportion at a temperature of 900° C. to 1200° C. for 15 minutes to 40 hours in air. The composite oxide is characterized in that its thermochromism exists only when it is prepared from the above-mentioned starting materials under the foregoing calcination conditions, and that its physical and chemical properties are distinct from those of a conventional strontium-manganese composite oxide expressed by the formula $SrMnO_3$. The Thermochromic Composite Oxide exhibits a grey or pale green color when at a temperature higher than the thermochromic transition temperature, and a pale red color when at a temperature lower than the thermochromic transition temperature. The colors before and after the thermochromic transition are in high contrast to each other and therefore can be visually identified with great ease.

As stated above, a large number of researchers or research and development personnel around the globe have made great efforts over the past three decades or so to develop, manufacture, and apply thermochromic materials/coating materials that are intended for use in an extremely high-temperature environment (as disclosed in the First Prior Art Document), a room-temperature environment (as shown in the tables given above), or an extremely low-temperature environment (as disclosed in the Second Prior Art Document). While numerous patent applications may have been filed and granted for thermochromic materials/coating materials, few if any electrical wires on the market have used such a material. Some electrical wire manufacturers did attempt to make thermochromic electrical wires by incorporating a thermochromic material/coating material into the manufacturing process of an enameled wire, in the hope that the thermochromic coating or thermochromic insulating outer layer of a resulting thermochromic electrical wire can change color (e.g., from white indicating a low temperature to red indicating a high temperature, or from red indicating a low temperature to blackish purple indicating a high temperature) when heated (or more particularly when the conductive core of the thermochromic electrical wire generates heat due to a current overload), so that an intuitive and easily identifiable early warning about the overloaded state of thermochromic electrical wire may be provided, hopefully alerting the wire user in real time that the load on the thermochromic electrical wire should be lowered in order to prevent fire accidents that can be attributed to sustained overload of the thermochromic electrical wire or to short-circuiting of an affected electrical device, the ultimate goal being to ensure the safety of the user's life and property. However, after reviewing the current status of the wire market, such intended thermochromic electrical wires have not been found to be mass-produced for sale. Neither have any such thermochromic electrical wire equivalents been supplied to the market, let alone used extensively in different fields. The general public, therefore, have yet to benefit from the such intended thermochromic electrical wires.

In view of the afore-mentioned inadequacies, the present disclosure, cultivated by more than thirty years of professional experience in the development, design, and manufacture of various electrical wires, aims to increase the added value of an insulated wire by cladding the conductive core of the insulated wire with a thermochromic coating so that, when the conductive core generates heat due to an current overload, the thermochromic coating will change color and thereby provide a highly intuitive and easily identifiable early warning about the overloaded state of the insulated wire, alerting the wire user in real time that the load on the insulated wire should be lowered in order to prevent fire accidents that can be attributed to sustained overload of the insulated wire or to short-circuiting of an affected electrical device, so that the user's life and property would not be endangered. After an extensive research and in-depth analysis on the processes attempted by some manufacturers in the industry to make thermochromic electrical wires by incorporating a thermochromic material/coating material into the manufacturing process of an enameled wire, it has been found that, referring to FIG. 2, the method of making a thermochromic electrical wire 2 generally includes: making a bare copper wire 20; conveying the bare copper wire 20 into a thermochromic coating material tank (not shown) in order to coat the peripheral surface of the bare copper wire 20 evenly with the thermochromic coating material in the thermochromic coating material tank; passing the thermochromic coating material-coated copper wire 20 through a baking apparatus (not shown) in order to burn off the organic resin in the thermochromic coating material through baking, sinter the thermochromic substances in the thermochromic coating material, and thereby coat the peripheral surface of the bare copper wire 20 evenly and firmly with the sintered thermochromic substances, which form a thermochromic coating 21 on the peripheral surface of the bare copper wire 20; and guiding the thermochromic coating 21-coated copper wire 20 into an insulating outer layer extruder (not shown) in order for the extruder to form a transparent insulating outer layer 22 on the peripheral surface of the thermochromic coating 21-coated copper wire 20. The insulating outer layer 22 provides protection for the bare copper wire 20 and the thermochromic coating 21 against damage, and is transparent (i.e., allows the wire user to see through it) so that the user can easily and rapidly inspect, and identify any color change of, the thermochromic coating 21 in an intuitive manner and thereby determine whether the bare copper wire 20 is overloaded and, if necessary, which safety measures should be taken to prevent accidents. Ideally, with continued reference to FIG. 2, the thermochromic coating 21 should have changed color (e.g., from white indicating a low temperature to red indicating a high temperature) when the bare copper wire 20 in the conventional thermochromic electrical wire 2 generates heat due to a current overload and the temperature of the bare copper wire 20 reaches the thermochromic transition temperature (e.g., 70° C.) of the thermochromic coating 21, and the color change should have been seen through the transparent insulating outer layer 22 of the thermochromic electrical wire 2 as a supposedly intuitive and easily identifiable early warning about the overloaded state of the thermochromic electrical wire 2, thereby supposedly alerting the wire user in real time that the load on the thermochromic electrical wire 2 should be lowered in order to prevent fire accidents that can be attributed to sustained overload of the conventional thermochromic electrical wire 2 or to short-circuiting of an affected electrical device, supposedly ensuring the safety of the user's life and property. However, after reviewing the current status of the global electrical wire market, it has not been found that such an intended thermochromic electrical wire 2 has been mass-produced for sale on the market, or widely used. The reason lies not only in the fact that the complicated applying and baking process of the thermochromic coating 21 incurs extremely high material, equipment, and production costs relative to the market value of the thermochromic electrical wire 2, but also in the fact that the transparent design of the insulating outer layer 22 is in violation of the safety-related wire insulation color coding regulations in many countries and therefore hinders global marketing of the thermochromic electrical wire 2. Furthermore, most of the commercially available thermochromic substances tend to lose their thermochromic property after prolonged exposure to UV light. As the transparent insulating outer layer 22 of the thermochromic electrical wire 2 leaves the thermochromic coating 21 exposed to light, the thermochromic coating 21 is very likely to degrade after long-term UV exposure and end up without its thermochromic property, which if happening will render the entire design of the thermochromic electrical wire 2 pointless. The potential loss of the desired thermochromic property makes it impossible for consumers to accept, much less to benefit from the good intention behind, the thermochromic electrical wire 2.

To solve the problems stated above, Wang, Hailing; Qiao, Yuechun; Zhang, Hongyan; Wang, Lingling; Hu, Guanghui; Fan, Xiaoshu; Zhou, Meibiao; and Yu, Zongming, Chinese inventors, jointly filed a patent application entitled "WIRE CAPABLE OF CHANGING COLOR AS WARNING WHEN GENERATING HEAT DUE TO OVERLOAD AND METHOD FOR PREPARING THE SAME" (hereinafter, "Anti-Overload Color-Changing Early-Warning Wire") with the State Intellectual Property Office (hereinafter, "SIPO") of the People's Republic of China in May 2016. After formality examination, the application was published in August 2016 by the SIPO as Published Chinese Invention Patent Application No. 105869757A (hereinafter, "Third Prior Art Document"). As pointed out in their publication specification, the inventors believed that each current-carrying conductor in an insulated wire has a cross section-related safe current load limit, and is overloaded when the current flowing through its cross section exceeds the limit. The huge amount of heat generated by an overloaded conductor in an insulated wire will accelerate aging of, degrade, or oven damage the insulation on the periphery of the conductor, if not causing a short-circuit that may pose grave danger to people's lives and property by developing into a major fire accident. The publication specification further states that people are well aware that an insulated wire carries electricity; that to prevent electric shocks, people are generally advised against touching at will or colliding with an insulated wire that is in a working state; and that people can never tell if an insulated wire is overloaded simply from the appearance of the wire. The fact mentioned in the last statement is a key factor why disasters attributable to an overloaded insulated wire cannot be prevented at the earliest possible time. In light of this, the inventors joined forces to develop the Anti-Overload Color-Changing Early-Warning Wire claimed in the Third Prior Art Document, their objective being to provide a simple and easy-to-perform method for making the Anti-Overload Color-Changing Early-Warning Wire and impart thereto such properties as wear resistance, corrosion resistance, and waterproofness, so that the Anti-Overload Color-Changing Early-Warning Wire is suitable for use at home as well as in hospitals, schools, government agencies, public places of entertainment, and so on to prevent accidents through an early warning mechanism that changes color in response to heat generation associated with an overload. Referring to FIG. 3, an anti-overload color-changing early-warning wire 3 includes: a conductor 30 made of an electrically conductive metal; an insulating layer 31 that is made of an insulating material and clads the periphery of the conductor 30; an early warning coating 32 that is configured to change color when overheated and is applied over the outer periphery of the insulating layer 31; and a protective sheath 33 that is transparent and clads the outer periphery of the early warning coating 32 to serve as the outermost layer of the anti-overload color-changing early-warning wire 3. In one preferred embodiment of the anti-overload color-changing early-warning wire 3, the conductor 30 is a copper wire; the insulating layer 31 is made of polyvinyl chloride (hereinafter, "PVC"), which is resistant to temperatures as high as 70° C.; the early warning coating 32 is made of cuprous mercuric iodide ($Cu_2HgI_4$), which is red at room temperature and turns blackish purple when ambient temperature reaches 70° C. (i.e., the thermochromic transition temperature of $Cu_2HgI_4$); and the protective sheath 33 is made of transparent nylon 66. In another preferred embodiment, with continued reference to FIG. 3, the anti-overload color-changing early-warning wire 3 is made by a method including the steps as follows.

The peripheral surface of the copper wire 30 is clad with the insulating layer 31 by an extrusion process so as to produce an insulated core 3'. Generally, the copper wire 30 is allowed to stay at a working temperature up to 70° C., so the insulating layer 31 is preferably made of PVC, which is resistant to temperatures as high as 70° C.

The insulated core 3' is passed through a tank (not shown) that contains an early-warning coating material capable of changing color when overheated, in order for the peripheral surface of the insulated core 3' to be coated with the early-warning coating material.

Once coated with the early-warning coating material capable of changing color when overheated, the insulated core 3' is passed through, and thus baked in, an oven (not shown), the goal being to dry the early-warning coating material and thereby form the early warning coating 32 on the peripheral surface of the insulated core 3'. The early-warning coating material capable of changing color when overheated is preferably $Cu_2HgI_4$. $Cu_2HgI_4$ is a toxic inorganic material that exhibits reversible thermochromism, and whose crystals are in β, or regular tetrahedral, configuration when at a low temperature and turn into an α, or cubic, configuration when heated. The crystal lattices of the β and α allotropes of $Cu_2HgI_4$ can transform into each other such that the crystal color is changed. More specifically, $Cu_2HgI_4$ is red when at a low temperature and becomes blackish purple when heated to about 70° C.

The last step is to pass the early warning coating 32-coated insulated core 3' through a protective-sheath extruder (not shown) so as to form the protective sheath 33 on the outer surface of the early warning coating 32, thereby completing the anti-overload color-changing early-warning wire 3 claimed in the Third Prior Art Document. The thickness of the protective sheath 33 is preferably 0.2 mm. When the conductor 30 is overloaded, the early warning coating 32 will turn from red indicating a low temperature to blackish purple indicating a high temperature and thereby carry out the anti-overload color-changing early-warning function, and the wire user will be able to identify the color change of the early warning coating 32 and the corresponding loading state in an easy, clear and real-time manner, thanks to the transparency of the protective sheath 33.

With continued reference to FIG. 3, the specification of the Third Prior Art Document also states that when the conductor 30 is overloaded and thus heated over a predetermined design temperature (e.g., 70° C.), the early warning coating 32 will change color and thereby provide a real-time early warning mechanism regarding whether the working load of the anti-overload color-changing early-warning wire 3 is within a safe range. This anti-overload early warning mechanism is made possible by the fact that the temperature (i.e., 70° C.) at which the $Cu_2HgI_4$ (i.e., the early warning coating 32 capable of changing color when overheated) on the outer surface of the insulating layer 31 starts to change from a red color indicating a low temperature to a blackish purple color indicating a high temperature happens to match the highest allowable sustained working temperature of the copper wire (i.e., conductor) 30; and that in consequence the load on the anti-overload color-changing early-warning wire 3 can be accurately identified and monitored by simple visual inspection.

Nevertheless, it has been found that the anti-overload color-changing early-warning wire 3 of the Third Prior Art Document faces substantially the same technical bottlenecks as the thermochromic electrical wire 2, despite the aforesaid effects intended in the specification of the Third Prior Art Document. More specifically, not only does the complicated manufacturing process of the anti-overload color-changing early-warning wire 3 (which process is similar to that of the thermochromic electrical wire 2 in that it also requires the materials, equipment, and procedures with/by which to apply and bake the early warning coating 32) incur too high a production cost relative to the market value of the anti-overload color-changing early-warning wire 3, but also the insulating layer 31 is very likely to be damaged or degrade during the baking process and thus compromise the electrical properties of the anti-overload color-changing early-warning wire 3. In addition, the required transparency of the protective sheath 33 is in violation of the safety-related wire insulation color coding regulations in many countries, and this makes it impossible to market the anti-overload color-changing early-warning wire 3 worldwide. Moreover, as the early warning coating 32 capable of changing color when overheated tends to lose its thermochromic property after long-term exposure to natural UV radiation, the transparent protective sheath 33 of the anti-overload color-changing early-warning wire 3 contributes to such a loss by leaving the entire early warning coating 32 exposed to UV, and the purpose of the overall design of the anti-overload color-changing early-warning wire 3 can be frustrated as a result. Furthermore, the early warning coating 32 is applicable only when the anti-overload color-changing early-warning wire 3 has a diameter of 2.0 mm. If the wire diameter exceeds 2.0 mm, the cost and difficulty of the coating process can be so high that the end product is unacceptable to consumers in terms of price, let alone for the public to benefit from the good intension behind the anti-overload color-changing early-warning wire 3, which could probably be a major reason for the lack of mass production and/or extensive use of the anti-overload color-changing early-warning wire.

Given the aforesaid technical inadequacies of the thermochromic electrical wire 2 and of the anti-overload color-changing early-warning wire 3, it is an important issue for insulated wire designers and manufacturers to design a novel insulated wire that changes color when overheated under a current load. It is desirable that this novel insulated wire can be made at a reasonable cost; allows its appearance color to comply with the safety-related wire insulation color coding regulations of different countries and thus enable global marketing of the novel insulated wire; and provides optimal coverage and protection for the thermochromic coating in the novel insulated wire so that the thermochromic coating will not easily lose its thermochromic property due to exposure to natural UV light but ensures that its color change (e.g., from white indicating a low temperature to red indicating a high temperature, or from red indicating a low temperature to blackish purple indicating a high temperature) will be visible from outside the novel insulated wire whenever the internal conductive core is overloaded and reaches the design thermochromic transition temperature of the thermochromic coating due to the heat generated by the conductive core itself. The novel insulated wire is expected to provide a highly intuitive and readily identifiable early warning about its being overloaded, so as to alert the wire user in real time that the load on the novel insulated wire should be lowered in order to prevent fire accidents that can be attributed to sustained overload of the novel insulated wire or to short-circuiting of an affected electrical device, thereby ensuring the safety of the user's life and property. The very issue of designing a novel insulated wire is addressed by the present disclosure.

SUMMARY

In view of the aforesaid technical inadequacies of the thermochromic electrical wire 2 and of the anti-overload color-changing early-warning wire 3, the present disclosure employs years of practical professional experience in the development, design, and manufacture of various insulated wires into an extensive research and experiment and, after numerous tests and improvements, finally succeeded in developing an insulated wire capable of changing color when overheated under a current load and a method for making the same. The present disclosure provides a simpler insulated wire structure and a faster process for making insulated wires. The insulated wire according to the present disclosure not only can have different appearance colors that comply respectively with the safety-related wire insulation color coding regulations of different countries to enable global marketing, but also provides optimal coverage and protection for the thermochromic coating in the insulated wire so that the thermochromic coating will not easily lose its thermochromic property due to exposure to natural UV light but ensures that its color change (e.g., from white indicating a low temperature to red indicating a high temperature, or from red indicating a low temperature to blackish purple indicating a high temperature) will be clearly visible from outside the insulated wire whenever the internal conductive core is overloaded and reaches the design thermochromic transition temperature (e.g., 70° C.) of the thermochromic coating due to the heat generated by the conductive core itself. Thus, the insulated wire according to the present disclosure can provide a highly intuitive and readily identifiable early warning about its being overloaded, thereby alerting the wire user in real time that the load on the insulated wire should be lowered in order to prevent fire accidents that can be attributed to sustained overload of the insulated wire or to short-circuiting of an affected electrical device, the ultimate goal being to ensure the safety of the user's life and property.

One aspect of the present disclosure is directed to a method for making an insulated wire capable of changing color when overheated under a current load. The method includes the steps as follows. First, at least one conductive core made of an electrically conductive metal is conveyed to a first extruder, and a peripheral surface of the conductive core is clad by the first extruder with a plastic insulating layer to form an insulated core. Then, at least one winding machine winds and fixes at least one thermochromic strip on a peripheral surface of the insulated core in a coiling or weaving manner, such that each two adjacent turns of the thermochromic strip on the peripheral surface of the insulated core are spaced apart from each other by a predetermined gap width, or overlap each other by a predetermined overlapping width. The peripheral surface of the insulated core is formed by the plastic insulating layer to be smooth, and facilitates said winding and fixing of the thermochromic strip on the peripheral surface of the insulated core. The thermochromic strip is a transparent-film strip made from a transparent plastic film. The transparent-film strip has a bottom side evenly coated with a thermochromic coating material and formed with a thermochromic coating made of the thermochromic coating material. Once the thermochromic strip is wound and fixed on the peripheral surface of the insulated core, the thermochromic coating is attached to the peripheral surface of the insulated core and directly receive heat transmitted through the plastic insulating layer. Then, a second extruder clads a transparent plastic protective layer to a top surface of the thermochromic strip wound and fixed on the peripheral surface of the insulated core. The thermochromic coating is well covered and protected by the transparent-film strip against the negative impact of, and potential damage by, UV light and moisture and is hence allowed to maintain its thermochromic property. The material color of the plastic insulating layer can be changed in order for the appearance color of the insulated wire to comply with the safety-related wire insulation color coding regulations of each country where the insulated wire is intended to be sold. More importantly, when the conductive core is overloaded and generates heat, the heat will be conducted directly and rapidly through the plastic insulating layer to the thermochromic coating so that the color of the thermochromic coating is changed as soon as the temperature of the conductive core reaches the thermochromic transition temperature of the thermochromic coating. The color change can be seen from outside the insulated wire through the transparent-film strip and the transparent plastic protective layer as a highly intuitive and readily identifiable early warning about the overload state of the insulated wire, alerting the wire user in real time that the load on the insulated wire should be lowered in order to protect the insulated wire from damage by sustained overload, prevent accidents associated with such damage, and thereby ensure the safety of the user's life and property.

Another aspect of the present disclosure is directed to the foregoing method with an additional step of heating the thermochromic strip with a heating device after the thermochromic strip is wound and fixed on the peripheral surface of the insulated core. Once the hot-melt adhesive layer on the bottom surface of the thermochromic strip is heated to its melting point and begins to melt, the thermochromic strip and the peripheral surface of the insulated core are adhesively and securely bonded together where they contact each other.

Yet another aspect of the present disclosure is directed to an insulated wire capable of changing color when overheated under a current load. The insulated wire includes an insulated core, at least one thermochromic strip, and a transparent plastic protective layer. The insulated core is provided therein with at least one conductive core made of an electrically conductive metal. The conductive core has a peripheral surface clad with a plastic insulating layer. The at least one thermochromic strip is a transparent-film strip made from a transparent plastic film. The transparent-film strip has a bottom side evenly coated with a thermochromic coating material and formed with a thermochromic coating made of the thermochromic coating material. The thermochromic strip is wound on a peripheral surface of the insulated core such that the thermochromic coating is attached to an outer surface of the plastic insulating layer and is able to directly receive heat transmitted through the plastic insulating layer. Each two adjacent turns of the thermochromic strip overlap or are spaced apart from each other by a predetermined width. The transparent plastic protective layer is formed on and covering a top surface of the thermochromic strip.

Still another aspect of the present disclosure is directed to the foregoing insulated wire with an anti-UV ingredient mixed into at least one of the transparent-film strip and the transparent plastic protective layer in order for the transparent-film strip and/or the transparent plastic protective layer to provide optimal coverage and protection for the thermochromic coating.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

Figure 1A:
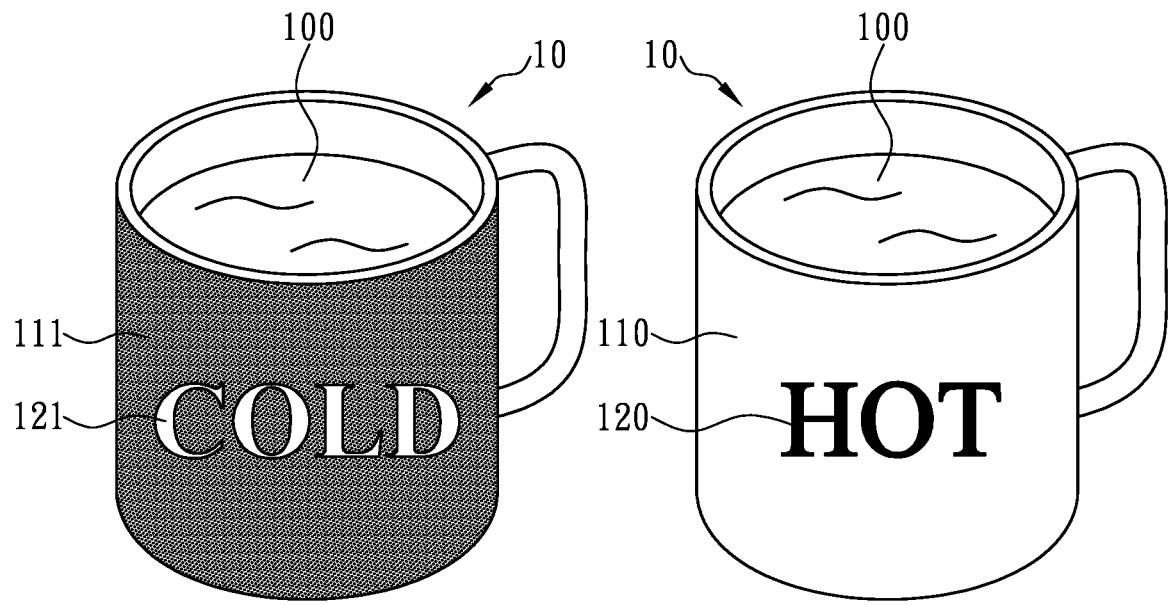
FIG. 1a and FIG. 1b show a mug to which a thermochromic coating material has been applied.
Figure 1B:
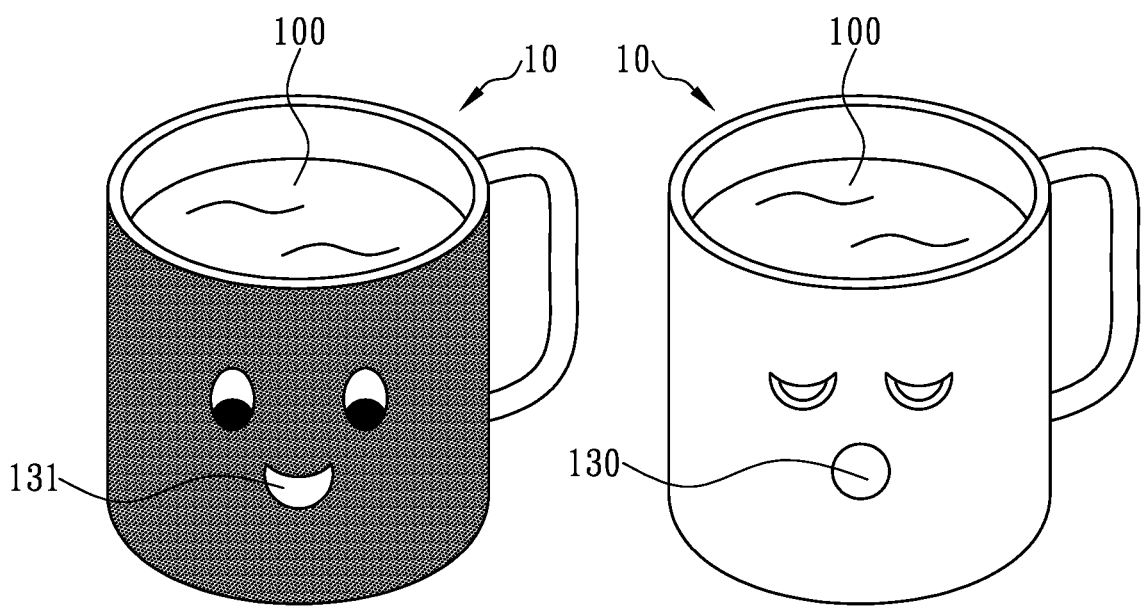
Figure 2:
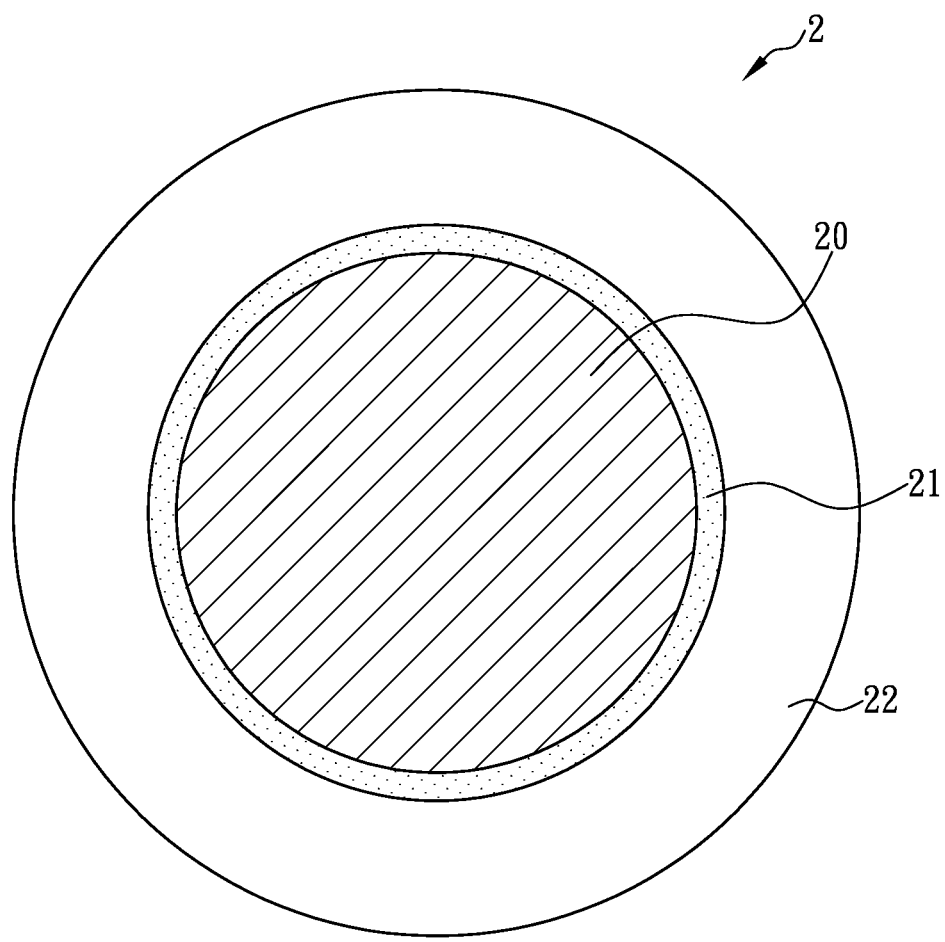
FIG. 2 shows the cross-sectional structure of a conventional thermochromic electrical wire.
Figure 3:
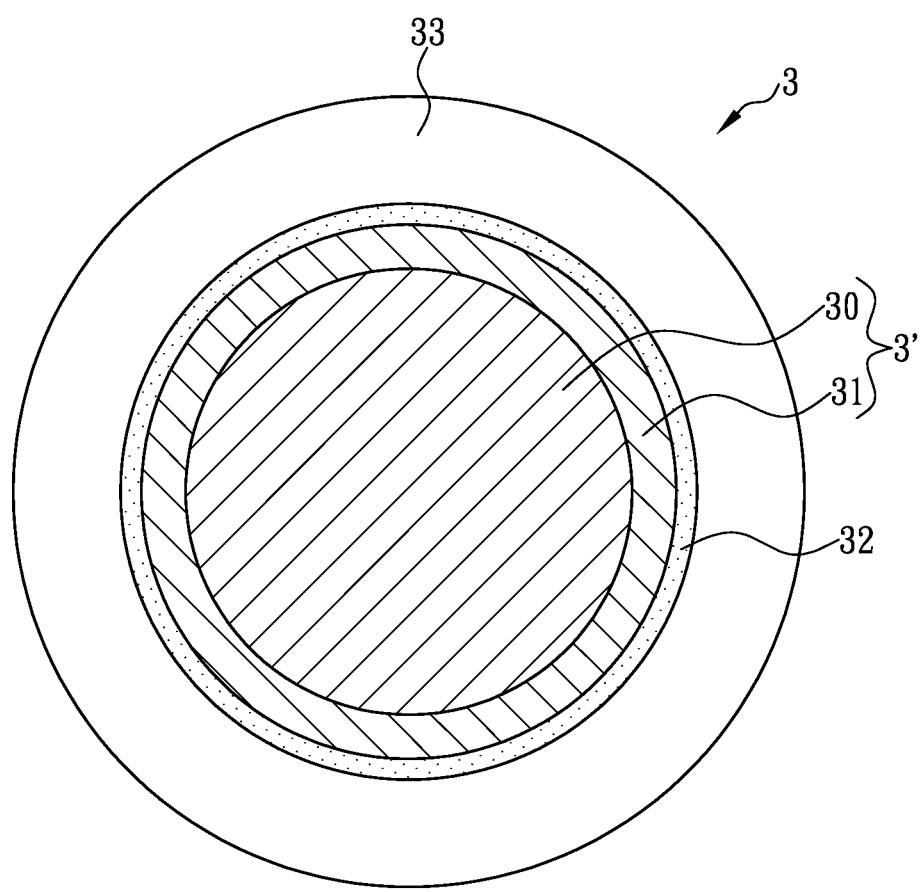
FIG. 3 shows the cross-sectional structure of the anti-overload color-changing early-warning wire disclosed in the Third Prior Art Document.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like.

The term "electrical wire" generally refers to a conductive wire that can transmit electric energy. An electrical wire may be categorized as a bare wire, an electromagnetic wire, and/or an insulated wire according to its structure. However, the present disclosure is not limited thereto. A bare wire may be a conductive metal wire without an insulating layer or coating. Some common bare wire examples are copper wires, flattened aluminum wires, overhead stranded conductors, and various formed conductors (e.g., formed wires and busbars, including copper busbars, aluminum busbars, and so on). Bare wires can be used in outdoor overhead applications and indoor bus ducts and switchboxes. An electromagnetic wire can be a conductive wire coated with an insulating layer and configured to generate a magnetic field when supplied with electricity or generate an induced current when placed in a magnetic field. Electromagnetic wires can serve as the windings of an electric motor or transformer or are used in other electromagnetic devices. The conductor in an electromagnetic wire is typically copper, which has good electrical and mechanical properties. The insulating layer of an electromagnetic wire provides resistance to heat, moisture, and solvents and can be made of different insulating materials in order to have different properties. Electromagnetic wires can be divided by the insulating layer into enameled wires and wrapped wires. Enameled wires can be made by coating bare copper wires with an insulating paint that forms the insulating layer, and have been widely used in a variety of electric machines, appliances, instruments, and gauges thanks to their relatively thin, and hence less space-occupying, insulating layer. The properties of enameled wires may vary with the insulating materials used. Wrapped wires may be divided by the wrapping material into cotton-covered wires, silk-covered wires, fiber glass-coated wires, paper-covered wires, plastic film-coated wires, and so on. Cotton-covered wires and silk-covered wires show relatively low resistance to heat, are relatively bulky, and therefore have low market acceptance, if not gradually falling out of use. A fiber glass-coated wire is made by wrapping a bare circular copper wire with fiber glass and then impregnating the wrapped copper wire with organic silicone. Fiber glass-coated wires can withstand temperatures as high as 180° C. and have good insulation performance and high mechanical strength. Paper-covered wires can be used in oil-immersed transformers. A plastic film-coated wire can be made by applying an adhesive over a polyimide (PI) film, wrapping a wire with the film, and then baking the wrapped wire to melt the adhesive film and thereby form an insulating layer that is tough, resilient, winding-friendly, and resistant to both wear and heat. Plastic film-coated wires have found wide application in aviation equipment. Insulated wires are very common and extensively used in people's daily lives and work. An insulated wire may include three parts: a conductive core, an insulating layer, and a protective layer. However, the present disclosure is not limited thereto. The conductive core can be classified as hard, soft, super soft, or movable according to user needs and may include a single conductor, two conductors, three conductors, four conductors, and so forth. However, the present disclosure is not limited thereto. The insulating layer and the protective layer may be made of a material that is resistant to acid/alkali corrosion and wear, such as rubber or plastic. However, the present disclosure is not limited thereto. Insulated wires are widely used in electrical equipment, instruments, gauges, telecommunication equipment, power supply circuits, and lighting circuits that work on an alternating-current (AC) voltage, for example, not higher than 500 V, or a direct-current (DC) voltage, for example, not higher than 1,000 V. However, the present disclosure is not limited thereto. In certain embodiments, an insulated wire may be different from a cable in that an insulated wire has one or a plurality of pliable conductive cores that are clad with a pliable and insulating protective layer, whereas a cable may have one or a plurality of insulated wires that are clad with a relatively tough protective layer made of metal or rubber. However, the present disclosure is not limited thereto. In fact, there is no well-defined distinction between an insulated wire and a cable. In certain embodiments, an "insulated wire" may have a relatively small number of conductive cores, a relatively small wire diameter, and a relatively simple structure, and as coated with an insulating layer; a "bare wire" as having no insulating layer; and a "cable" as different from the former two. However, the present disclosure is not limited thereto.

As insulated wires are currently widely used in people's daily lives and work, it is important that their production cost meets market expectation and demand, that they have good production quality, and that they are provided with an anti-overload early warning mechanism. A color change of a thermochromic coating of an insulated wire (e.g., from white indicating a low temperature to red indicating a high temperature, or from red indicating a low temperature to blackish purple indicating a high temperature) is sure to be clearly visible from outside the insulated wire whenever the internal conductive core is overloaded and reaches the design thermochromic transition temperature (e.g., 70° C.) of the thermochromic coating due to the heat generated by the conductive core itself, thus providing a highly intuitive and readily identifiable early warning about the overloaded state of the insulated wire, alerting the wire user in real time that the load on the insulated wire should be lowered in order to prevent fire accidents that can be attributed to sustained overload of the insulated wire (or to short-circuiting of an affected electrical device). The ultimate goal thereof is to ensure the safety of the user's life and property.

Hence, based on the more-than-thirty-year professional experience in electrical wire developing, designing, and manufacturing, and with a view to increase the added value of insulated wires, the present disclosure aims to overcome the aforesaid technical inadequacies of the thermochromic electrical wire 2 and of the anti-overload color-changing early-warning wire 3, and is the result of a series of researching, designing, manufacturing, testing, and improving processes, and eventually develops an insulated wire capable of changing color when overheated under a current load. This novel insulated wire can be made at a reasonable cost; allows its apparent color to comply with the safety-related wire insulation color coding regulations of different countries and thus enable global marketing of the insulated wire; provides optimal coverage and protection for the thermochromic coating in the insulated wire so that the thermochromic coating will not easily lose its thermochromic property due to exposure to natural UV light; and ensures that its color change (e.g., from white indicating a low temperature to red indicating a high temperature, or from red indicating a low temperature to blackish purple indicating a high temperature) will be clearly visible from outside the insulated wire whenever the internal conductive core is overloaded and reaches the design thermochromic transition temperature of the thermochromic coating due to the heat generated by the conductive core itself. Thus, the insulated wire of the present disclosure can provide a highly intuitive and readily identifiable early warning about its being overloaded, alerting the user in real time that the load on the insulated wire should be lowered in order to prevent fire accidents that can be attributed to sustained overload of the insulated wire or to short-circuiting of an affected electrical device, thereby ensuring the safety of the user's life and property.

Figure 4:
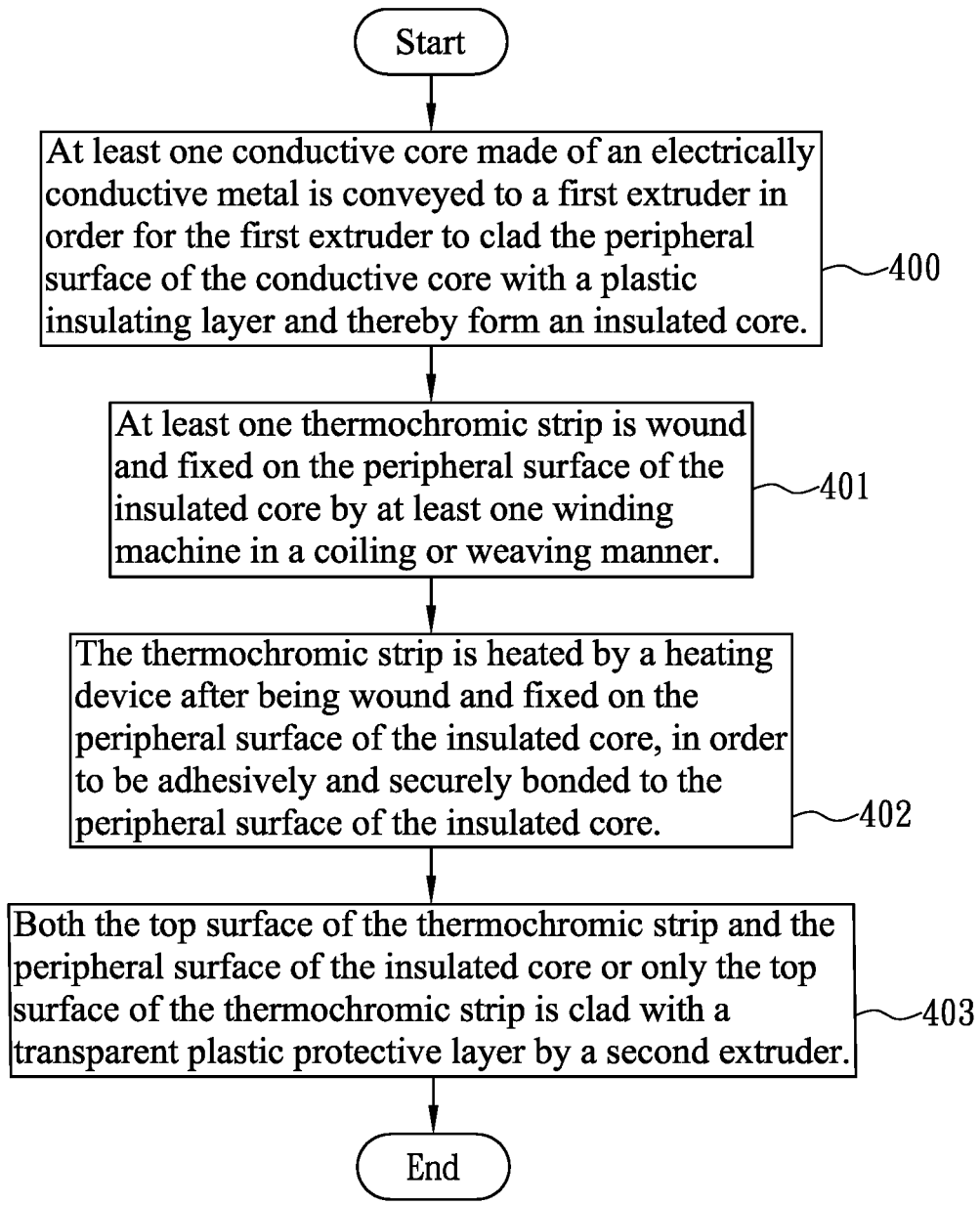
FIG. 4 shows a flowchart of the method for making an insulated wire according to the present disclosure.

Referring to FIG. 4, in certain embodiments, the present disclosure provides a method for making an insulated wire that changes color when overheated under a current load. The method includes the steps as follows.

Step 400: To begin with, referring also to FIG. 5a and FIG. 5b, at least one conductive core 50 made of an electrically conductive metal is conveyed to a first extruder (not shown) in order for the first extruder to clad the peripheral surface of the conductive core 50 with a plastic insulating layer 51 and thereby form an insulated core 5'. The plastic insulating layer 51 provides the insulated core 5' with a smooth peripheral surface that makes it easy to wind and thereby fix at least one thermochromic strip 52 precisely on the peripheral surface of the insulated core 5' in the following step.

Figure 5A:
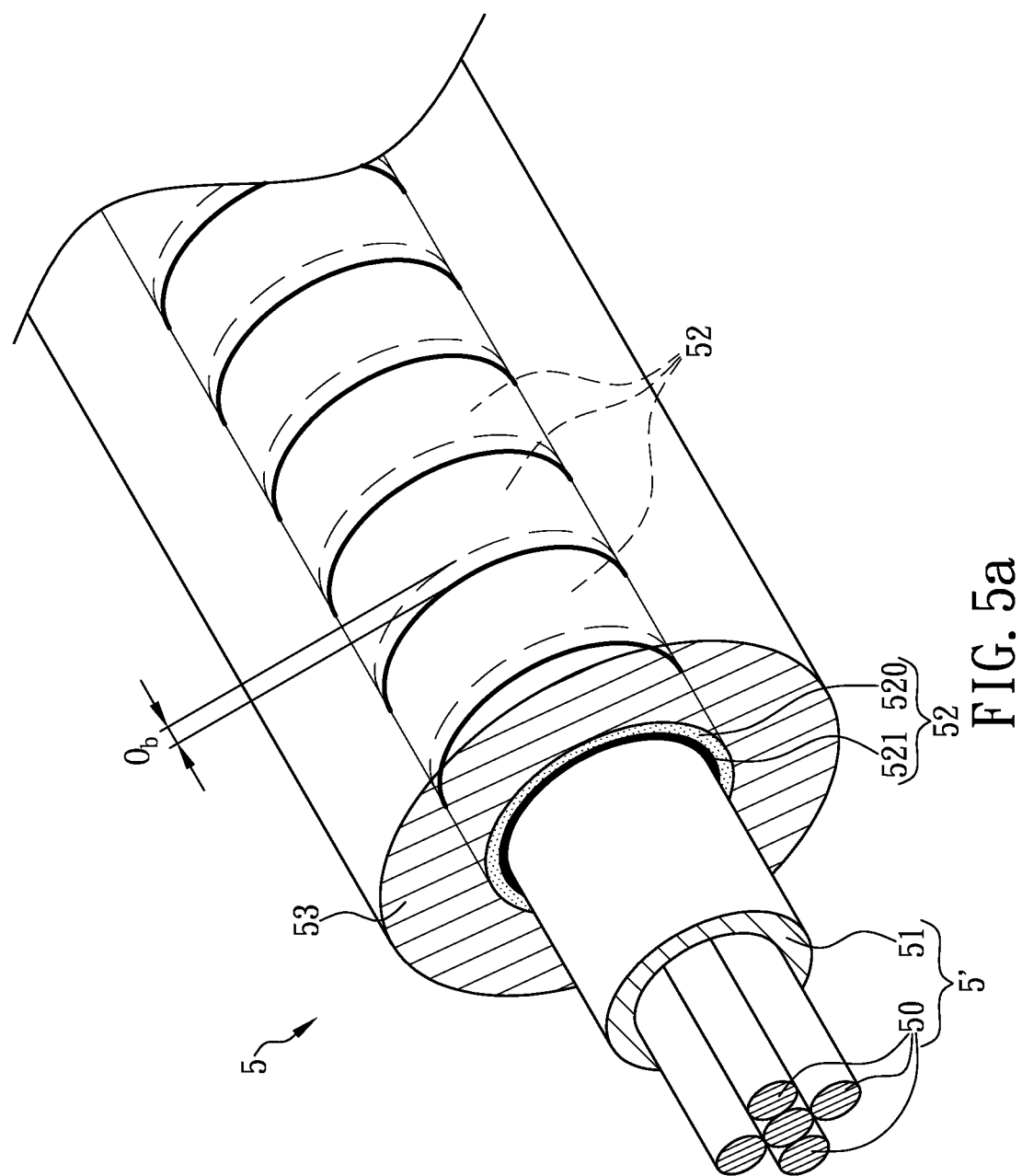
FIG. 5a and FIG. 5b show the cross-sectional structures of the insulated wires according to the present disclosure.
Figure 5B:
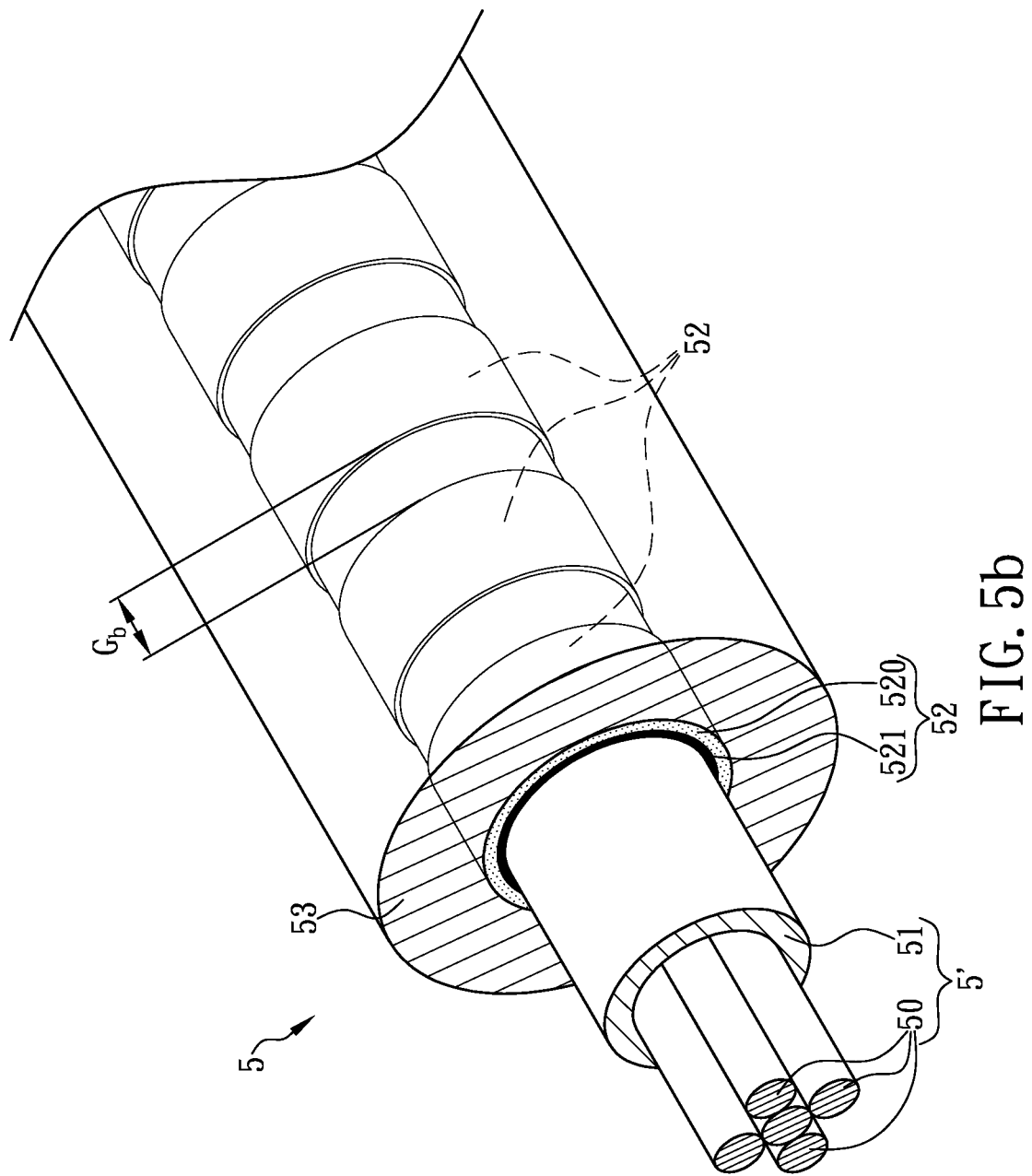

Step 401: At least one winding machine (not shown) is used to wind and thereby fix at least one thermochromic strip 52 on the peripheral surface of the insulated core 5' in a coiling or weaving manner. Each two adjacent turns of the thermochromic strip 52 on the peripheral surface of the insulated core 5' can overlap each other by a proper overlapping width $O_b$ (as shown in FIG. 5a), or be spaced apart from each other by a proper gap width $G_b$ (as shown in FIG. 5b). The thermochromic strip 52 is a transparent-film strip 520 made of a transparent plastic material. In light of the description of the present disclosure, the manufacturing of transparent-film strip 520 may be entrusted to a professional according to the description of the present disclosure. The bottom side of the transparent-film strip 520 is evenly coated with a thermochromic coating material and is thus formed with a thermochromic coating 521. Once the thermochromic strip 52 is wound on and clads the peripheral surface of the insulated core 5', the thermochromic coating 521 is tightly attached to the outer surface of the plastic insulating layer 51 and can therefore directly receive the heat transmitted from the conductive core 50 through the plastic insulating layer 51. The winding tension by which the transparent-film strip 520 is wound on the peripheral surface of the insulated core 5', and the waterproofness and acid/alkali corrosion resistance of the transparent-film strip 520, allows the thermochromic coating 521 to be isolated between the transparent-film strip 520 and the peripheral surface of the insulated core 5' in a watertight and airtight manner that provides optimal protection against the negative impact of the moisture and acidic/alkaline substances in the environment, so that the thermochromic coating 521 maintains the desired thermochromic property.

Step 403: With continued reference to FIG. 4, FIG. 5a, and FIG. 5b, after the thermochromic strip 52 is wound and thereby fixed on the peripheral surface of the insulated core 5', a second extruder (not shown) is used to clad the top surface of the thermochromic strip 52 (or, the peripheral surface of the insulated core 5' and the top surface of the thermochromic strip 52) with a transparent plastic protective layer 53 to complete the production of an insulated wire 5 capable of changing color when overheated under a current load.

Under the protection of the transparent-film strip 520, the thermochromic coating 521 is well covered and shielded from the negative impact and damage of UV light and moisture and can hence retain the desired thermochromic property. Moreover, the material color of the plastic insulating layer 51 can be changed so that a mixture of this color and the color of the thermochromic coating 521 (which mixed color defines the appearance color of the insulated wire 5) can comply with the safety-related wire insulation color coding regulations of whichever country where the insulated wire 5 is intended to be sold. More importantly, when the conductive core 50 is overloaded and heat is generated from the overloading, the heat will be conducted directly and rapidly through the plastic insulating layer 51 to the thermochromic coating 521, so the thermochromic coating 521 will change color (e.g., from white indicating a low temperature to red indicating a high temperature, or from red indicating a low temperature to blackish purple indicating a high temperature) as soon as the temperature of the conductive core 50 reaches the thermochromic transition temperature (e.g., 70° C.) of the thermochromic coating 521. The color change will be clearly visible from outside the insulated wire 5 through the transparent-film strip 520 and the transparent plastic protective layer 53, serving as a highly intuitive and readily identifiable early warning about the overload state of the insulated wire 5, alerting the wire user in real time that the load on the insulated wire 5 should be lowered in order to protect the insulated wire 5 from damage by sustained overload, prevent accidents associated with such damage, and thus ensure the safety of the user's life and property.

It is noted that the present disclosure is not limited to the embodiments described above. The present disclosure can be implemented differently according to practical needs and may include additional steps to enhance the production result and quality of the insulated wire 5. For example, to ensure that the thermochromic strip 52 is precisely wound on and fixedly clads the peripheral surface of the insulated core 5' and that each two adjacent turns of the thermochromic strip 52 maintain the designed gap width $G_b$ or overlapping width $O_b$ therebetween (i.e., will not be shifted away from their respective intended positions defined by the gap width $G_b$ or the overlapping width $O_b$) while the transparent plastic protective layer 53 is being applied, the method according to certain embodiments of the present disclosure further includes the step as follows.

Step 402: Referring again to FIG. 4, FIG. 5a, and FIG. 5b, the thermochromic strip 52 is heated with a heating device (not shown) after being wound and thereby fixed on the peripheral surface of the insulated core 5'. More specifically, the bottom surface of the thermochromic strip 52 is coated with a hot-melt adhesive layer (not shown), and once the hot-melt adhesive layer is heated to its melting point, the thermochromic strip 52 and the peripheral surface of the insulated core 5' are adhesively and securely bonded together to prevent the thermochromic strip 52 from peeling off or getting loose. Thus, by designing the gap width $G_b$ or the overlapping width $O_b$ properly, the appearance color of the insulated wire 5 can be precisely controlled to not only comply with the safety-related wire insulation color coding regulations of different countries in an overloaded high-temperature state as well as in a normal low-temperature state, but also provide a highly intuitive and easily identifiable early warning about the overloaded state of the insulated wire 5 when the conductive core 50 in the insulated wire 5 is overloaded.

In certain embodiments, the present disclosure provides an insulated wire 5 as shown in FIG. 5a that changes color when overheated under a current load. The insulated wire 5 includes an insulated core 5', at least one thermochromic strip 52, and a transparent plastic protective layer 53. The insulated core 5' is provided therein with at least one conductive core 50 made of an electrically conductive metal. The peripheral surface of the conductive core 50 is clad with a plastic insulating layer 51. The cladding is performed by a first extruder. The thermochromic strip 52 is a transparent-film strip 520 made from a transparent plastic film. The bottom side of the transparent-film strip 520 is evenly coated with a thermochromic coating material and is thus formed with a thermochromic coating 521. The thermochromic strip 52 is wound and thereby fixed on the peripheral surface of the insulated core 5' such that the thermochromic coating 521 is attached to the outer surface of the plastic insulating layer 51 and can directly receive the heat transmitted through the plastic insulating layer 51. Each two adjacent turns of the thermochromic strip 52 overlap each other by a proper overlapping width $O_b$. The top surface of the thermochromic strip 52 is clad with a transparent plastic protective material by a second extruder, and the transparent plastic protective material forms the transparent plastic protective layer 53.

In certain embodiments, the present disclosure provides an insulated wire 5 as shown in FIG. 5b that changes color when overheated under a current load. The insulated wire 5 includes an insulated core 5', at least one thermochromic strip 52, and a transparent plastic protective layer 53. The insulated core 5' is provided therein with at least one conductive core 50 made of an electrically conductive metal. The peripheral surface of the conductive core 50 is clad with a plastic insulating layer 51 by a first extruder. The thermochromic strip 52 is a transparent-film strip 520 made from a transparent plastic film. The bottom side of the transparent-film strip 520 is evenly coated with a thermochromic coating material and is thus formed with a thermochromic coating 521. The thermochromic strip 52 is wound and thereby fixed on the peripheral surface of the insulated core 5' such that the thermochromic coating 521 is attached to the outer surface of the plastic insulating layer 51 and can directly receive the heat transmitted through the plastic insulating layer 51. Each two adjacent turns of the thermochromic strip 52 are spaced apart from each other by a proper gap width $G_b$. The peripheral surface of the insulated core 5' and the top surface of the thermochromic strip 52 are clad with a transparent plastic protective material by a second extruder, and the transparent plastic protective material forms the transparent plastic protective layer 53.

Under the protection of the transparent-film strip 520 and the transparent plastic protective layer 53, the thermochromic coating 521 is well covered and shielded from the negative impact and damage of UV light and moisture and can hence retain the desired thermochromic property. Moreover, the material color of the plastic insulating layer 51 and of the transparent-film strip 520 can be changed so that a mixture of the two colors (which mixed color defines the appearance color of the insulated wire 5) can comply with the safety-related wire insulation color coding regulations of whichever country where the insulated wire 5 is intended to be sold. More importantly, when the conductive core 50 is overloaded and generates heat, the heat will be conducted directly and rapidly through the plastic insulating layer 51 to the thermochromic coating 521, so the thermochromic coating 521 will change color as soon as the temperature of the conductive core 50 reaches the thermochromic transition temperature of the thermochromic coating 521. The color change will be clearly visible from outside the insulated wire 5 through the transparent-film strip 520 and the transparent plastic protective layer 53, serving as a highly intuitive and readily identifiable early warning about the overload state of the insulated wire 5, alerting the wire user in real time that the load on the insulated wire 5 should be lowered in order to protect the insulated wire 5 from damage by sustained overload, prevent accidents associated with such damage, and thus ensure the safety of the user's life and property.

In order for the peripheral surface of the insulated core 5' to be wound and clad with the thermochromic strip 52 optimally, the thermochromic strip 52 preferably has a width ranging from 1.0 mm to 5.0 mm and a thickness less than 0.08 mm, and the thermochromic coating 521 preferably has a thickness ranging from 0.01 mm to 0.04 mm. Besides, it is preferable that the transparent-film strip 520 is made of polyethylene terephthalate (PET), PVC, or biaxially oriented polypropylene (BOPP); that the overlapping width $O_b$ is 10%~50% of the width of the thermochromic strip 52; and that the gap width $G_b$ is 20%~300% of the width of the thermochromic strip 52. To effectively prevent UV light from penetrating the transparent plastic protective layer 53 and the transparent-film strip 520 and compromising the thermochromic property of the thermochromic coating 521, in certain embodiments, the present disclosure further includes mixing an anti-UV ingredient into the material of the transparent plastic protective layer 53 and/or the material of the transparent-film strip 520 during the preparation of those materials, in order for the transparent plastic protective layer 53 and the transparent-film strip 520 to shield the thermochromic coating 521 from UV light in the optimal manner.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for making an insulated wire capable of changing color when overheated under a current load, the method comprising the steps of:
   conveying at least one conductive core made of an electrically conductive metal to a first extruder, and cladding, by the first extruder, a peripheral surface of the conductive core with a plastic insulating layer to form an insulated core;
   winding and fixing, by at least one winding machine, at least one thermochromic strip on a peripheral surface of the insulated core in a coiling or weaving manner such that each two adjacent turns of the thermochromic strip on the peripheral surface of the insulated core are spaced apart from each other by a predetermined gap width or overlap each other by a predetermined overlapping width, wherein the peripheral surface of the insulated core is formed by the plastic insulating layer to be smooth, and configured to facilitate said winding and fixing of the thermochromic strip on the peripheral surface of the insulated core, and the thermochromic strip is a transparent-film strip made from a transparent plastic film and having a bottom side evenly coated with a thermochromic coating material and formed with a thermochromic coating made of the thermochromic coating material and configured to, once the thermochromic strip is wound and fixed on the peripheral surface of the insulated core, be attached to the peripheral surface of the insulated core and directly receive heat transmitted through the plastic insulating layer; and
   cladding, by a second extruder, a transparent plastic protective layer to a top surface of the thermochromic strip wound and fixed on the peripheral surface of the insulated core.

2. The method according to claim 1, further comprising:
   heating, by a heating device, the thermochromic strip wound and fixed on the peripheral surface of the insulated core so that a hot-melt adhesive layer coated on a bottom surface of the thermochromic strip is heated to a melting point thereof and begins to melt to adhesively bond the thermochromic strip and the peripheral surface of the insulated core together where the thermochromic strip and the peripheral surface of the insulated core contact each other.

3. The method according to claim 2, wherein the predetermined overlapping width is 10%~50% of a width of the thermochromic strip.

4. The method according to claim 3, wherein the width of the thermochromic strip ranges from 1.0 mm to 5.0 mm.

5. The method according to claim 4, wherein the thermochromic strip has a thickness less than 0.08 mm.

6. The method according to claim 5, wherein the thermochromic coating has a thickness ranging from 0.01 mm to 0.04 mm.

7. The method according to claim 6, wherein the transparent-film strip is made of at least one of polyethylene terephthalate (PET), polyvinyl chloride (PVC), or biaxially oriented polypropylene (BOPP).

8. The method according to claim 7, wherein at least one of the transparent-film strip and the transparent plastic protective layer is mixed therein with an anti-ultraviolet (UV) light ingredient so as to cover and protect the thermochromic coating against UV light.

9. The method according to claim 2, wherein the predetermined gap width is 20%~300% of a width of the thermochromic strip.

10. The method according to claim 9, wherein the width of the thermochromic strip ranges from 1.0 mm to 5.0 mm.

11. The method according to claim 10, wherein the thermochromic strip has a thickness less than 0.08 mm.

12. The method according to claim 11, wherein the thermochromic coating has a thickness ranging from 0.01 mm to 0.04 mm.

13. The method according to claim 12, wherein the transparent-film strip is made of at least one of polyethylene terephthalate (PET), polyvinyl chloride (PVC), or biaxially oriented polypropylene (BOPP).

14. The method according to claim 13, wherein at least one of the transparent-film strip and the transparent plastic protective layer is mixed therein with an anti-ultraviolet (UV) light ingredient so as to cover and protect the thermochromic coating against UV light.

15. An insulated wire capable of changing color when overheated under a current load, comprising:
   an insulated core provided therein with at least one conductive core made of an electrically conductive metal, wherein the conductive core has a peripheral surface clad with a plastic insulating layer;
   at least one thermochromic strip being a transparent-film strip made from a transparent plastic film and having a bottom side evenly coated with a thermochromic coating material and formed with a thermochromic coating made of the thermochromic coating material, and wound on a peripheral surface of the insulated core such that the thermochromic coating is attached to an outer surface of the plastic insulating layer and is able to directly receive heat transmitted through the plastic insulating layer, wherein each two adjacent turns of the thermochromic strip overlap or are spaced apart from each other by a predetermined width; and
   a transparent plastic protective layer formed on and covering a top surface of the thermochromic strip.

16. The insulated wire according to claim 15, further comprising a hot-melt adhesive layer coated on a bottom surface of the thermochromic strip and configured to, after being heated by a heating device to a melting point of the hot-melt adhesive layer and melting, adhesively bond the thermochromic strip and the peripheral surface of the insulated core together where the thermochromic strip and the peripheral surface of the insulated core contact each other.

17. The insulated wire according to claim 16, wherein the each two adjacent turns of the thermochromic strip overlap each other by a predetermined overlapping width that is 10%~50% of a width of the thermochromic strip.

18. The insulated wire according to claim 17, wherein the width of the thermochromic strip ranges from 1.0 mm to 5.0 mm.

19. The insulated wire according to claim 18, wherein the thermochromic strip has a thickness less than 0.08 mm.

20. The insulated wire according to claim 19, wherein the thermochromic coating has a thickness ranging from 0.01 mm to 0.04 mm.

21. The insulated wire according to claim 20, wherein the transparent-film strip is made of at least one of polyethylene terephthalate (PET), polyvinyl chloride (PVC), or biaxially oriented polypropylene (BOPP).

22. The insulated wire according to claim 21, wherein at least one of the transparent-film strip and the transparent plastic protective layer is mixed therein with an anti-ultraviolet (UV) light ingredient so as to cover and protect the thermochromic coating against UV light.

23. The insulated wire according to claim 16, wherein the each two adjacent turns of the thermochromic strip are spaced apart from each other by a predetermined gap width that is 20%~300% of a width of the thermochromic strip.

24. The insulated wire according to claim 23, wherein the width of the thermochromic strip ranges from 1.0 mm to 5.0 mm.

25. The insulated wire according to claim 24, wherein the thermochromic strip has a thickness less than 0.08 mm.

26. The insulated wire according to claim 25, wherein the thermochromic coating has a thickness ranging from 0.01 mm to 0.04 mm.

27. The insulated wire according to claim 26, wherein the transparent-film strip is made of at least one of polyethylene terephthalate (PET), polyvinyl chloride (PVC), or biaxially oriented polypropylene (BOPP).

28. The insulated wire according to claim 27, wherein at least one of the transparent-film strip and the transparent plastic protective layer is mixed therein with an anti-ultraviolet (UV) light ingredient so as to cover and protect the thermochromic coating against UV light.

* * * * *